United States Patent [19]

Vielhaber et al.

[11] Patent Number: 5,659,575
[45] Date of Patent: Aug. 19, 1997

[54] METHOD AND APPARATUS FOR IMPROVING DATA REGENERATION IN ASYNCHRONOUS NETWORK COMMUNICATION

[75] Inventors: Timothy J. Vielhaber, Avon Lake; Tina M. Sudnick, Grafton, both of Ohio

[73] Assignee: Grinnell Corporation, Exeter, N.H.

[21] Appl. No.: 431,093

[22] Filed: Apr. 28, 1995

[51] Int. Cl.[6] ............................................. H04B 17/02
[52] U.S. Cl. ............................................. 375/213; 375/214
[58] Field of Search .................................. 375/213–214, 375/219, 355–356, 369; 370/13.1, 32, 48, 97; 340/291; 329/4; 178/717

[56] References Cited

U.S. PATENT DOCUMENTS

| | | | |
|---|---|---|---|
| 4,160,951 | 7/1979 | Thyselius | 375/214 |
| 4,175,214 | 11/1979 | Wedmore | 370/44 |
| 4,334,303 | 6/1982 | Bertin et al. | 370/13.1 |
| 4,611,324 | 9/1986 | Giacometti et al. | 370/97 |
| 4,710,976 | 12/1987 | Wakabayashi et al. | 370/13.1 X |
| 4,930,118 | 5/1990 | Sugihara et al. | 370/13.1 X |
| 4,937,812 | 6/1990 | Itoh et al. | 370/13.1 |
| 5,231,629 | 7/1993 | Kotzin et al. | 375/214 |

FOREIGN PATENT DOCUMENTS 2 216 366  10/1989  United Kingdom.

OTHER PUBLICATIONS

Murdock, G., et al., "Build a Direction–Sensing Bidirectional Repeater", *Electronic Design*, (vol. 37, No. 10), May 11, 1989, as reprinted in National Semiconductor Application Note 702, AN–702, pp. 1-368–1-372.

*Primary Examiner*—Young T. Tse
*Attorney, Agent, or Firm*—Keck, Mahin & Cate

[57] ABSTRACT

A method and apparatus for improving data regeneration in an asynchronous communication network is described where data is received on a two wire connection bus at a node in a communication network and is immediately retransmitted to another node therein. Incoming serial data is sampled at the time center of the serial data bit and is then immediately retransmitted based on the sampled data. The delay associated with buffering one full byte of data is reduced by a factor of 20 since the improved data regeneration technique of the present invention immediately retransmits the regenerated data one-half bit after it is received. Therefore, the network throughput is increased by a factor of 2000% and the network transmission media length is increased by a factor corresponding to the number of network nodes.

7 Claims, 6 Drawing Sheets

METHOD AND APPARATUS FOR IMPROVING DATA REGENERATION IN ASYNCHRONOUS NETWORK COMMUNICATION

BACKGROUND OF THE INVENTION

1. Field of the Invention

This present invention relates to an improved method and apparatus for data regeneration in asynchronous network communication.

2. Description of Prior Art

Communication networks which transmit data over wire or fiber are limited in the distance in which the data may be transmitted and successfully recovered at the receiving end. The physical properties of the transmission media as well as the properties of the data transmitter and data receiver determine the maximum communication distance, 1, between transmitter and receiver. In networks that do not implement any type of data repeater or regeneration, the length, 1, is the maximum length for the entire network.

Prior art data repeaters have been utilized in long communication lines to increase the distance between the transmitter and receiver. The repeaters typically work by amplifying the signal. Direction sensing bi-directional repeaters are known in the art and are described, for example, in an article by Gary Murdock and John Goldie entitled *Build a Direction-Sensing Bidirectional repeater*, Vol. 37, No. 10, Electronic Design, May 11, 1989, reprinted in National Semiconductor AN-702. These prior art repeaters, however, only amplify the signal and do not regenerate the data as new, clean data. Therefore, if there is any distortion or noise in the data, it is not corrected by the repeater.

To solve the problem of distorted data, various methods of asynchronous network communication provide for data regeneration at each node of the communication network which typically involves the buffering of a portion of the data in the receiving node before regenerating and retransmitting the data to the next node of the network. The current methods of data buffering require that the entire message (i.e., one to m bytes of data) or at a minimum, one byte of date (8 data bits plus a start and stop bit) be buffered by the receiving node before the data is regenerated and retransmitted to the next node in the communication network. By using data regeneration at each of the network nodes, n, the overall network transmission media length can be increased such that an overall length of n×1 can be achieved.

These prior art repeaters and data regenerators fail to accomplish the objects set out below which include significantly reducing the data buffering to one half bit of data, and therefore significantly increasing the network throughput, while at the same time providing the n×1 overall network transmission media length.

SUMMARY OF THE INVENTION

The general object of the present invention is to improve the method of data regeneration in asynchronous network communication by reducing data buffering to a minimum. The reduction of the data buffering requirement to one half bit of data significantly improves and increases the asynchronous network communication throughput over previous data regeneration techniques found in the prior art. Data is sampled during the middle of the data bit, then it is regenerated and retransmitted to the next communication node. In prior art data regeneration techniques, a byte of data is buffered before the data is regenerated and retransmitted to the next node of the communication network.

The improved data regeneration technique yields an effective 2000% improvement in the data regeneration time which translates into a 2000% improvement in network throughput.

It is another object of the invention to steer data (to be retransmitted) among the two data ports that are associated with each communication node. By steering the data, valid data from either port can be regenerated and directed out the other port automatically. Therefore, there is no need for a dedicated transmit port and a dedicated receive port.

It is a further object of the invention to provide the maximum wiring distance between nodes and the maximum overall wiring distance for the communication network. By implementing this data regeneration technique, the maximum wiring distance, 1, of many current communication networks can be supported between each node, thereby improving the wiring distance capacity of an n node network from 1, to n*l.

The above, as well as additional objects, features and advantages of the invention will become apparent in the following detailed description.

DETAILED DESCRIPTION

The preferred embodiment of the invention is directed to a fire control system for use in a building, structure or the like. The various nodes of the fire control system each include processing hardware in combination with sensors and control actuators. The nodes are connected throughout the building by a two-wire connection bus which permits two way communication therebetween.

Figure 1:
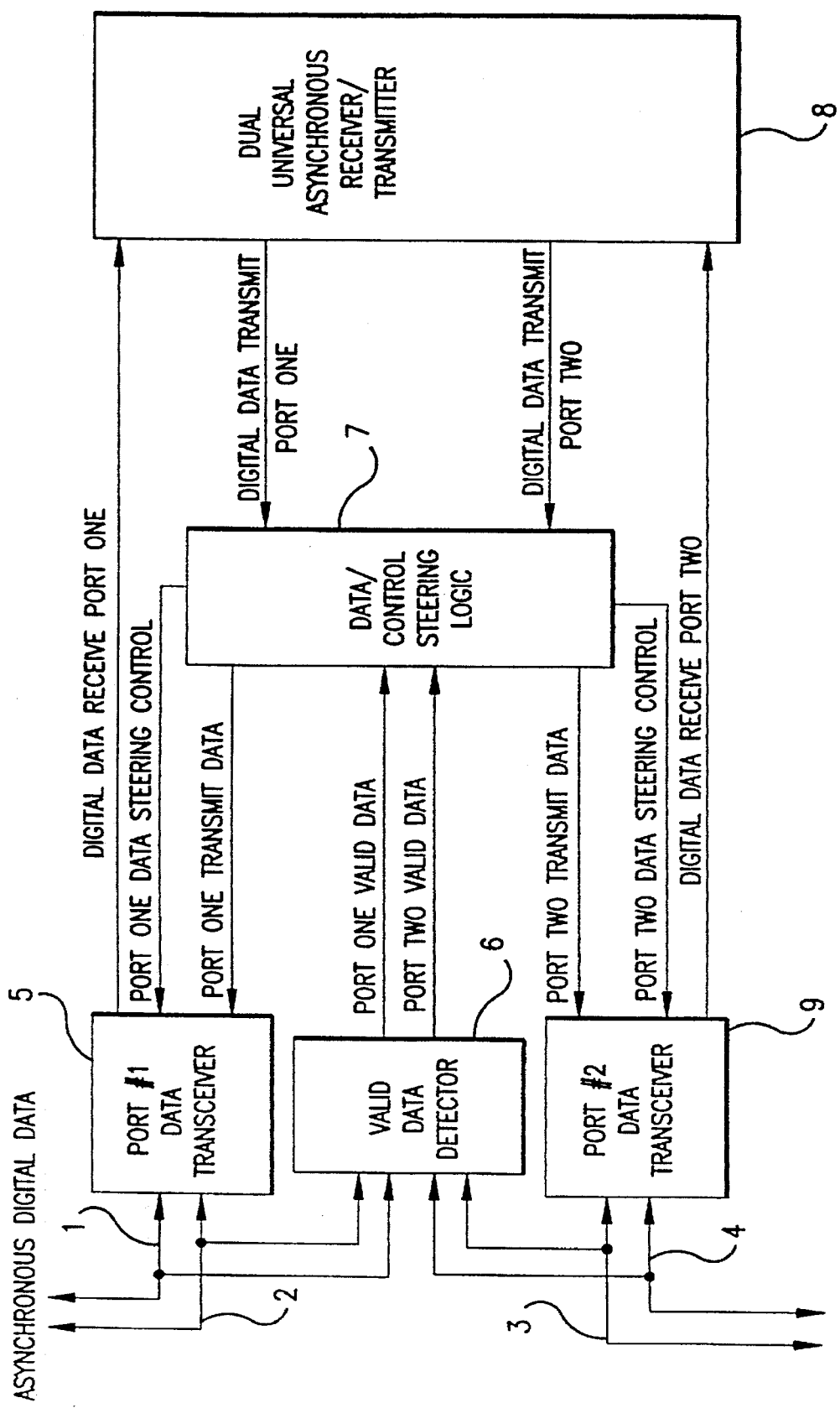
FIG. 1 is a block diagram illustrating the asynchronous communication data regeneration technique.

FIG. 1 shows a block diagram of the asynchronous communication data regeneration technique utilized in the fire control system. A two-wire connection bus 1,2 associated with port 1 and a two-wire connection bus 3,4 associated with port 2 connects all the nodes of the control system throughout the building providing two way communication. If a serial data stream arrives at port 1, a port 1 data transceiver 5 receives the serial data while valid data detector 6 simultaneously determines whether the serial data is valid. The valid data detector 6 sends a signal to the data/control steering logic 7 if the data is valid so that the data/control steering logic 7 will automatically steer the regenerated data out port 2.

The port 1 data transceiver 5 transmits the data to one port of a dual universal asynchronous receiver/transmitter (DUART) 8 which transmits the data to the data/control steering logic 7. The DUART 8 is operated in an automatic echo mode which receives the digital data and regenerates and retransmits the data with a one half bit delay. The data/control steering logic 7 steers the data to the port 2 data transceiver 9 based on the signal from the valid data detector 6. The data/control steering logic 7 controls the steering Of the data from the receiver to the transmitter for transmission to the next node. It should be noted that the two way communication flow of the bus allows the data flow to be reversed with the input going into the port 2 data transceiver 9 and the output being directed out the port 1 data transceiver 5.

Figure 2A:
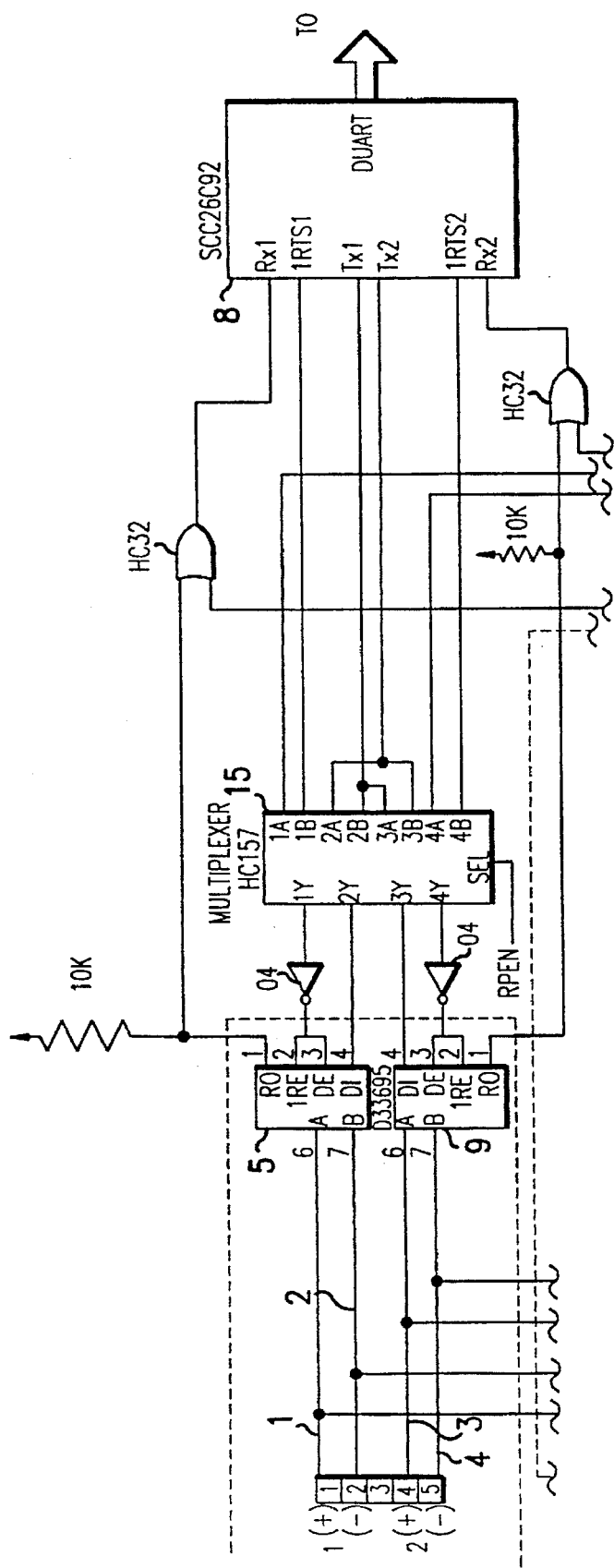
FIGS. 2A and 2B are circuit diagrams of the preferred embodiment of the invention.
Figure 2B:
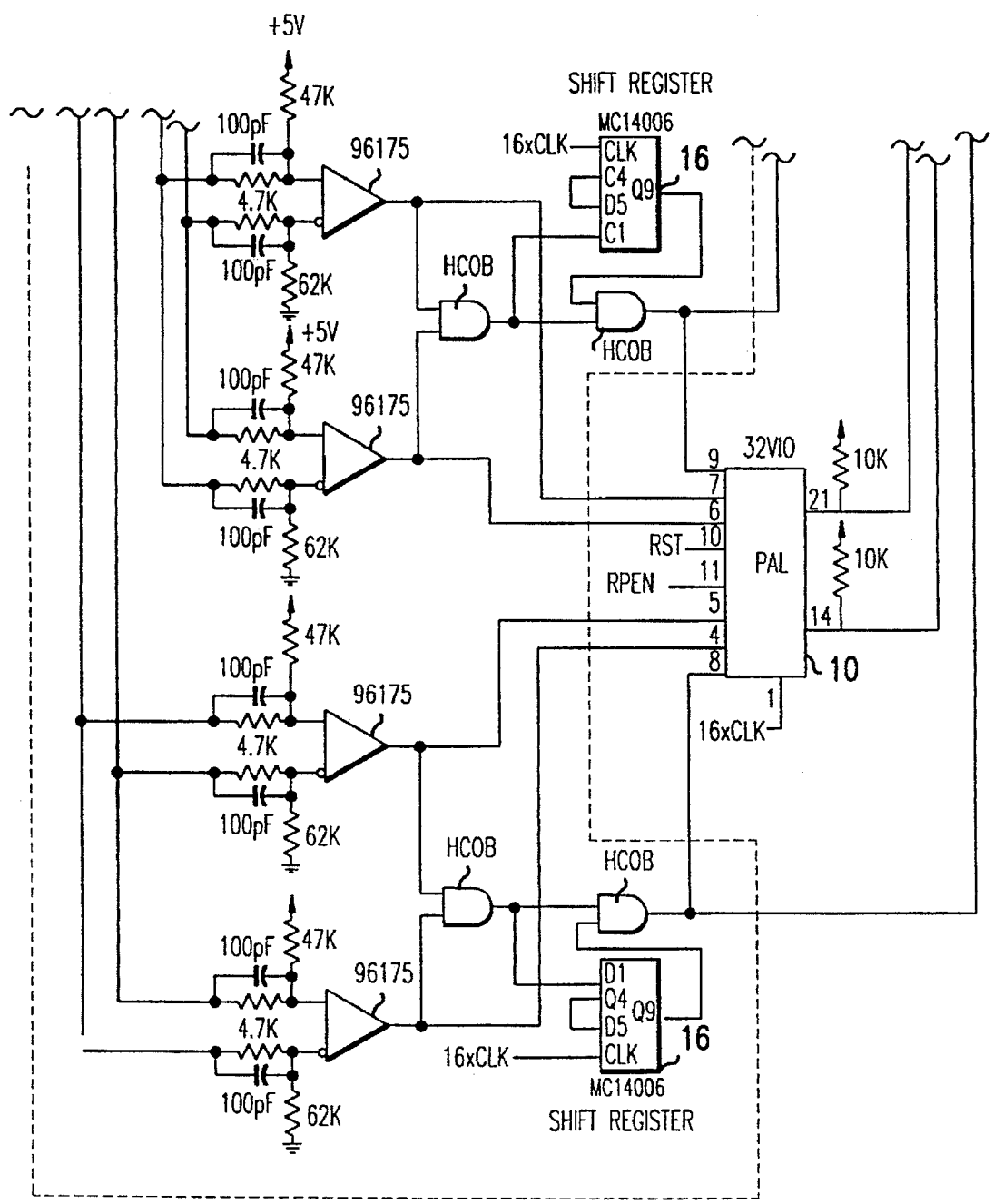

FIG. 2 shows a detailed circuit diagram of the preferred embodiment of the asynchronous communication data regeneration circuit of the fire control system. The port 1 and 2 data transceivers 5 and 9, respectively, are identified in block (a) of FIG. 2. The valid data detector 6 is identified as block (b) of FIG. 2 and determines whether the input data is valid. A PAL 10 in FIG. 2 programmed as a repeater state machine logic array comprises the data/control steering logic 7 which steers the valid data out the appropriate port in response to signals from the valid data detector 6. The shift register 16 and AND-gates associated with each channel form a digital filter and signifies valid data.

The repeater state machine PAL 10 steers the regenerated data out the appropriate output port while reducing the data buffering requirement to one half bit of data. The pin-out of the repeater state machine PAL 10 corresponds to the following:

| PIN 1 | CLOCK | | ; 16x CLOCK FROM DUART |
|---|---|---|---|
| PIN 4 | LV1 | COMB | ; VALID 0 ON LEFT RS485 CHANNEL |
| PIN 5 | LV0 | COMB | ; VALID 1 ON LEFT RS485 CHANNEL |
| PIN 6 | RV1 | COMB | ; VALID 0 ON RIGHT RS485 CHANNEL |
| PIN 7 | RV0 | COMB | ; VALID 1 ON RIGHT RS485 CHANNEL |
| PIN 8 | BL | COMB | ; LEFT CHANNEL VALID DATA |
| PIN 9 | BR | COMB | ; RIGHT CHANNEL VALID DATA |
| PIN 10 | RST | COMB | ; CHIP RESET |
| PIN 11 | EN | COMB | ; REPEATER ENABLED |
| PIN 12 | GND | | ; GROUND |
| PIN 14 | RTSL | COMB | ; LEFT CHANNEL RTS |
| PIN 16 | ST1 | REG | ; STATE BIT 1 |
| PIN 17 | ST0 | REG | ; STATE BIT 0 |
| PIN 21 | RTSR | COMB | ; RIGHT CHANNEL RTS |
| PIN 24 | VCC | | ; POWER. |

Note, not all the pins listed above are employed in the circuit implementation of FIG. 2.

The DUART 8 in FIG. 2 receives the digital data and regenerates and retransmits the data with the one half bit delay. The DUART 8 samples the incoming serial data at the time center of the serial data bit. With this sample of the data, the DUART 8 determines whether the data bit is a 0 or a 1 and then immediately begins retransmitting the data out its transmit line, based on the sample of the data. The data is output through the appropriate port data transceiver by multiplexer 15 based on whether regenerated data is being sent out to the communication network or whether the data originated from the node. The data is not sampled until the middle of the data bit to minimize the possibility of incorrectly interpreting the data and then is immediately retransmitted. The half bit delay is required because the DUART cannot correctly identify whether the received bit is a 1 or 0 until half of the bit has been received. A microprocessor communicates with the DUART 8 via parallel data transmission and the data is available for transfer to the microprocessor over its parallel data bus after the start and stop bits are stripped off the serial data byte.

Figure 3:
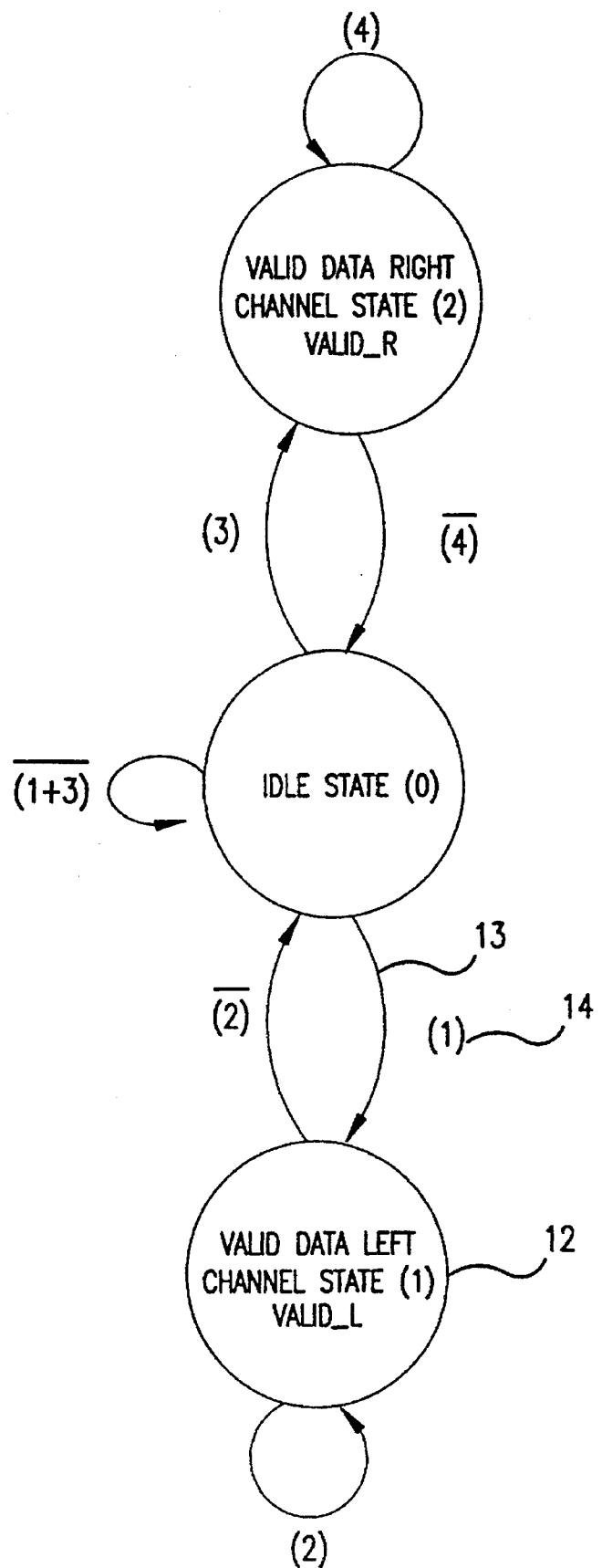
FIG. 3 is a state diagram of the programmable array logic employed by the preferred embodiment of the invention.

FIG.3 is a state diagram of the logic implemented by the repeater state machine PAL 10 (FIG. 2) of the data/control steering logic 7 in FIG. 1. The state diagram of FIG. 3 provides a graphical representation of the logic that is employed to steer a valid data stream. Each circle 12 in the state diagram of FIG. 3 represents a possible internal state of the repeater state machine PAL 10. The information that is associated with each possible internal state of the repeater state machine PAL 10 is defined by the following Boolean Equation Segments:

IDLE—Both channels of repeater in listen mode;

VALID_L—Valid data on left channel; and

VALID_R—Valid data on right channel.

The arrows 13 connecting each state indicate a permissible transition between the corresponding states and are represented by the state transition numbers 14 in parenthesis. The permissible state transitions are the input conditions under which the transition between states will occur and are defined by the following state transition equations:

| IDLE | := COND1 -> VALID_L |
|---|---|
| | + COND3 -> VALID_R |
| | +-> IDLE; |
| VALID_L | := COND2 -> VALID _L |
| | +-> IDLE; |
| VALID_R | := COND4 -> VALID_R |
| | +-> IDLE. |

Each state transition number 14 is defined by the following state condition equations:

COND1=/BL*/LV0*BR*/EN*/RST;

COND2=/BL*/EN*/RST;

COND3=/BR*/RV0*BL*/EN*/RST;

COND4=/BR*/EN*/RST.

where COND1 corresponds to "(1)" in FIG. 3, COND2 corresponds to "(2)", etc. The state output equations and state assignment equations which correspond to the state diagram in FIG. 3 are as follows:

State Output Equations

IDLE.OUTF=RTSL*RTSR;

VALID_L.OUTF=RTSL*/RTSR;

VALID_R.OUTF=/RTSL*RTSR;

State Assignment Equations

IDLE=/ST1*/ST0;STATE0

VALID_L=/ST1*ST0;STATE1

VALID_R=ST1*/ST0;STATE2.

Figure 4:
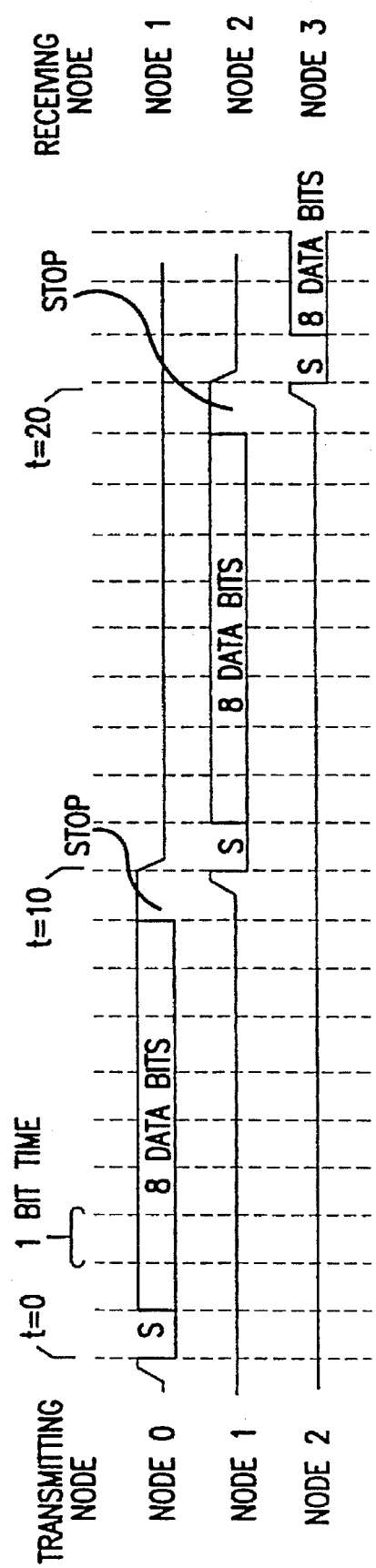
FIG. 4 is a timing diagram of a prior art data regeneration technique.

FIG. 4 is a timing diagram of a prior art data regeneration technique. Referring to FIG. 4, the data byte (consisting here of a start bit, 8 data bits and a stop bit) is transmitted from node 0 at time=0. The full data byte can be assumed to be received at node 1 at the same time node 0 completes transmission of the data (i.e., there are no delays associated with the transmission media). In the prior art data regeneration technique, data can begin to be retransmitted only after the full byte has been received, at time=10. The data is then fully received at node 2 at time t=20. Therefore, the total delay between the first transmitted data bit and the first received data bit at node n is given as:

$$t\,(\text{delay}) = (n-1) \times 10 \text{ bit times}$$
$$= (n-1) \times 10 \times (1/\text{baud rate}) \text{ seconds}.$$

Figure 5:
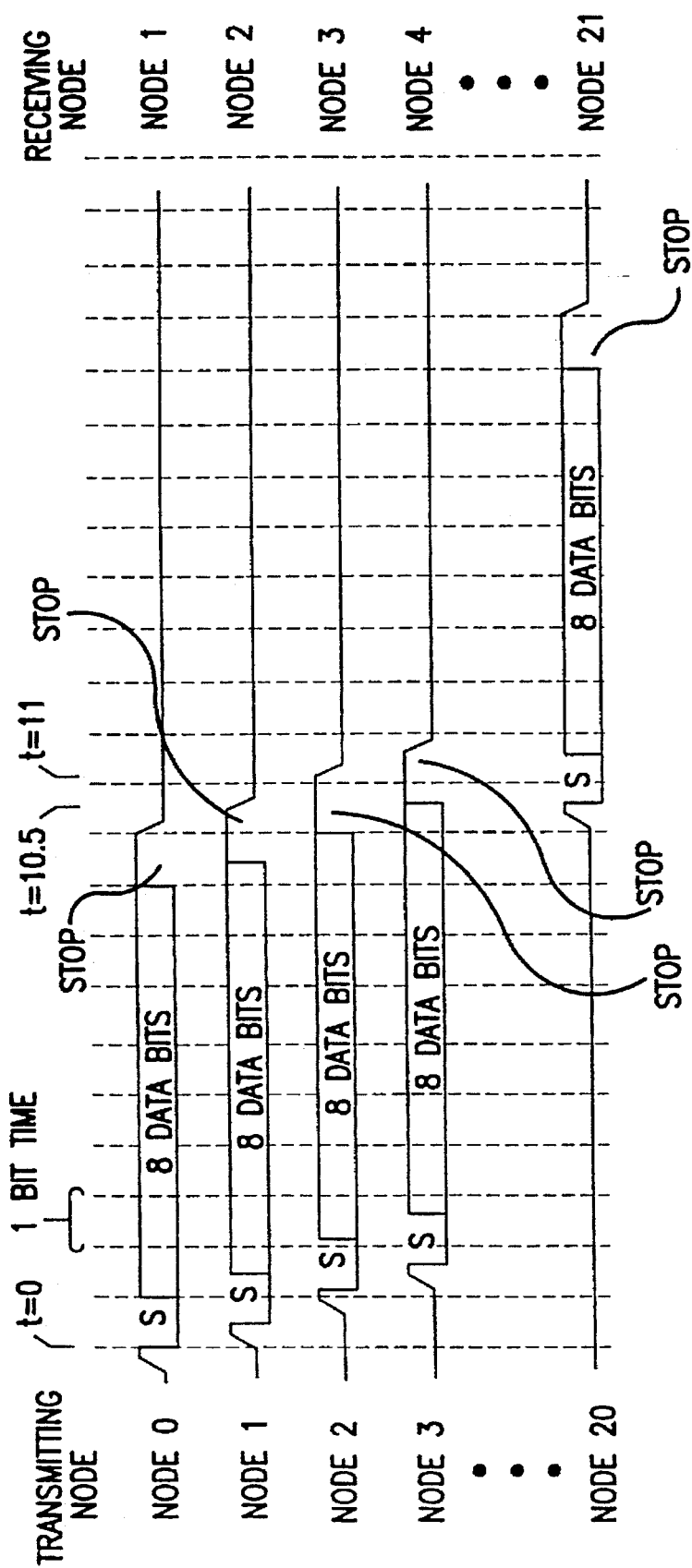
FIG. 5 is a timing diagram of the improved data regeneration technique of the invention.

FIG. 5 is a timing diagram of the improved data regeneration technique of the invention. In the improved data regeneration technique, the data can begin to be transmitted one half bit time after it is received at node 1, at time=0.5. The data is then fully received at the second node at time=10.5. The total delay between the first transmitted data bit and the first received data bit at node n is given as:

$$t \text{(delay)} = (n-1) \times 0.5 \text{ bit times}$$
$$= (n-1) \times 0.5 \times (1/\text{baud rate}) \text{ seconds.}$$

The delay in a data bit being transmitted by node 0 and being received at node n is given by (n−1) *10 for the prior art data regeneration technique and given by (n−1) *0.5 for the improved data regeneration technique. Comparing the delays associated with the prior art and the improved technique illustrates that the improved technique is 10/0.5=20 times (2000%) better than the prior art method.

The method and apparatus for improving data regeneration in asynchronous network communication described above have several advantages over the prior art which should be apparent to those skilled in the art from the specification. The preferred embodiment of the invention may be changed without departing from the scope of the invention and should be construed as illustrative and not as limiting the invention as described herein.

We claim:

1. A method for regenerating data in asynchronous network communication, which comprises:

(a) receiving data from a first data transceiver of a first node of a communications network;

(b) sampling said data from said first data transceiver at the time center of a first data bit;

(c) verifying whether said data has been received by said first data transceiver;

(d) regenerating said data for transmission to a second node in the communication network;

(e) steering said regenerated data to a second data transceiver in response to receiving of said data at said first node; and (f) transmitting said regenerated data from said second data transceiver to said second node in the communication network a fraction of a bit time after it is received at said first node.

2. A method for regenerating data in asynchronous network communication as set forth in claim 1, wherein said data is transmitted along a two way communication bus.

3. A method for regenerating data in asynchronous network communication as set forth in claim 1, wherein said communication network is directed to a fire control system.

4. A communication node for regenerating and retransmitting data in a communication network, which comprises:

(a) a first data transceiver for receiving data which includes serial data bits, at a first node of a two way communication bus of said communication network;

(b) a valid data detector for verifying said data and generating a signal in response to receipt of said data by said first data transceiver;

(c) a dual universal asynchronous receiver/transmitter for receiving said data from said first data transceiver and for sampling said data at the time center of a first data bit and for regenerating data;

(d) a data/control steering logic circuit for steering said regenerated data from said dual universal asynchronous receiver/transmitter upon receipt of said signal from said valid data detector; and (e) a second data transceiver for retransmitting said regenerated data into the communication network from said data/control steering logic circuit one half bit after receiving said data at said first data transceiver.

5. A communication node as set forth in claim 4, wherein said communication network is directed to a fire control system in a building.

6. A communication node as set forth in claim 4, wherein said data is regenerated and retransmitted with a one half bit delay after being received at said communication node.

7. A communication node as set forth in claim 4, wherein said communication node is for use in a fire control system.

* * * * *